United States Patent
Niikura et al.

(10) Patent No.: US 11,966,072 B2
(45) Date of Patent: Apr. 23, 2024

(54) PLANAR LIGHT SOURCE DEVICE AND LIQUID CRYSTAL DISPLAY DEVICE

(71) Applicant: Mitsubishi Electric Corporation, Tokyo (JP)

(72) Inventors: Eiji Niikura, Tokyo (JP); Saki Motokura, Tokyo (JP); Mikio Araki, Tokyo (JP); Mitsuru Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 17/632,273

(22) PCT Filed: Oct. 2, 2019

(86) PCT No.: PCT/JP2019/038939
§ 371 (c)(1),
(2) Date: Feb. 2, 2022

(87) PCT Pub. No.: WO2021/064903
PCT Pub. Date: Apr. 8, 2021

(65) Prior Publication Data
US 2022/0276429 A1   Sep. 1, 2022

(51) Int. Cl.
*F21V 8/00* (2006.01)
*G02F 1/13357* (2006.01)

(52) U.S. Cl.
CPC ......... *G02B 6/0068* (2013.01); *G02B 6/0036* (2013.01); *G02F 1/1336* (2013.01)

(58) Field of Classification Search
CPC .... G02B 6/0068; G02B 6/0036; G02F 1/1336
See application file for complete search history.

(56) References Cited

U.S. PATENT DOCUMENTS 7,632,002 B1 * 12/2009 Park ............... G02B 6/0088
362/616
2006/0002146 A1 * 1/2006 Baba ............... G02F 1/133603
362/613
(Continued)

FOREIGN PATENT DOCUMENTS

JP   2007-180005 A   7/2007
JP   2010-276789 A   12/2010
(Continued)

OTHER PUBLICATIONS

International Search Report, issued in PCT/JP2019/038939, dated Dec. 17, 2019.
(Continued)

Primary Examiner — Abdulmajeed Aziz
Assistant Examiner — Jessica M Apenteng
(74) Attorney, Agent, or Firm — Birch, Stewart, Kolasch & Birch, LLP

(57) ABSTRACT

A planar light source device includes a plurality of light sources that is independently drivable, a first light guide to emit light incident from the first light source from an emitting surface in an emitting direction, a second light guide that is contained in a second light emitting region adjacent to a first light emitting region containing the first light guide and emits light incident from a second light source from the emitting surface in the emitting direction, and a partition frame having a partition wall that is positioned between the first light guide and the second light guide, partitions the first light emitting region and the second light emitting region, and is provided with a gap from the emitting surface of the first light guide, in which an angle formed by a wall surface and a bottom face of the partition wall is an acute angle.

10 Claims, 14 Drawing Sheets

(56) References Cited

U.S. PATENT DOCUMENTS

| | | | |
|---|---|---|---|
| 2007/0013828 A1* | 1/2007 | Cho ................. | G02F 1/133308 |
| | | | 349/65 |
| 2007/0070625 A1* | 3/2007 | Bang ................ | G02F 1/133605 |
| | | | 362/240 |
| 2008/0158468 A1* | 7/2008 | Kim .................... | G02F 1/13336 |
| | | | 349/58 |
| 2015/0300576 A1 | 10/2015 | Matsuura | |
| 2018/0239081 A1* | 8/2018 | Maki ................... | G02B 6/0021 |

FOREIGN PATENT DOCUMENTS

| | | |
|---|---|---|
| JP | 2010-282911 A | 12/2010 |
| JP | 2015-218104 A | 12/2015 |
| JP | 2018-137044 A | 8/2018 |

OTHER PUBLICATIONS

Written Opinion of the International Searching Authority, issued in PCT/JP2019/038939, dated Dec. 17, 2019.
Japanese Office Action for Application No. 2021-550846, dated Aug. 2, 2022, with an English translation.

* cited by examiner

PLANAR LIGHT SOURCE DEVICE AND LIQUID CRYSTAL DISPLAY DEVICE

TECHNICAL FIELD

The present disclosure relates to a planar light source device using a light guide and a liquid crystal display device including the planar light source device.

BACKGROUND ART

In general, a liquid crystal display device includes a planar light source device that emits light, and a display panel that partially shields or transmits light from the planar light source device to display an image. In the conventional liquid crystal display device, even when a dark image is displayed, light similar to that when a bright image is displayed is emitted from the planar light source device. However, in recent years, a technology called "local dimming" has been put into practical use, in which a screen of a liquid crystal display device is divided into a plurality of light emitting regions, and the brightness of a planar light source device is partially adjusted in accordance with the brightness of an image displayed in each light emitting region. According to the local dimming, since the planar light source device is suppressed from emitting light more than necessary, the power consumption of the liquid crystal display device can be reduced.

Here, in the local dimming, it is important to prevent light from being emitted from each light emitting region to the adjacent light emitting region. Thus, for example, as in Patent Literature 1, it has been proposed to provide a partition frame which is a light shielding frame for preventing light from being emitted from each light emitting region to the adjacent light emitting region between light guides divided for each light emitting region.

CITATION LIST

Patent Literatures

Patent Literature 1: JP 2010-276789 A

SUMMARY OF INVENTION

Technical Problem

However, when the partition frame is provided between the light guides as in Patent Literature 1, there is a possibility that the partition frame portion of the planar light source device becomes dark and the partition frame appears as a dark line on the display screen.

An object of the present disclosure is to provide a planar light source device and a liquid crystal display device capable of preventing a partition frame portion of the planar light source device from becoming dark.

Solution to Problem

A planar light source device according to the present disclosure includes: a plurality of light sources that is arranged on a mounting surface of a light source substrate and independently drivable; a first light guide to emit light incident from a first light source included in the plurality of light sources from a first emitting surface in an emitting direction opposite to a direction from the first light source toward the light source substrate; a second light guide that is contained in a second light emitting region adjacent, on the mounting surface, to a first light emitting region containing the first light guide, and emits light incident from a second light source included in the plurality of light sources from a second emitting surface in the emitting direction; and a partition frame having a partition wall that is positioned between the first light guide and the second light guide, partitions the first light emitting region and the second light emitting region, and is provided with a gap from the first emitting surface, in which an angle formed by a wall surface of the partition wall on a side of the first light guide and a bottom face of the partition wall is an acute angle.

A liquid crystal display device according to the present disclosure includes the planar light source device described above, and a display panel that displays an image on a screen by transmitting or shielding light from the planar light source device.

Advantageous Effects of Invention

According to the present disclosure, it is possible to suppress darkening of the partition frame portion of the planar light source device.

DESCRIPTION OF EMBODIMENTS

Figure 1:
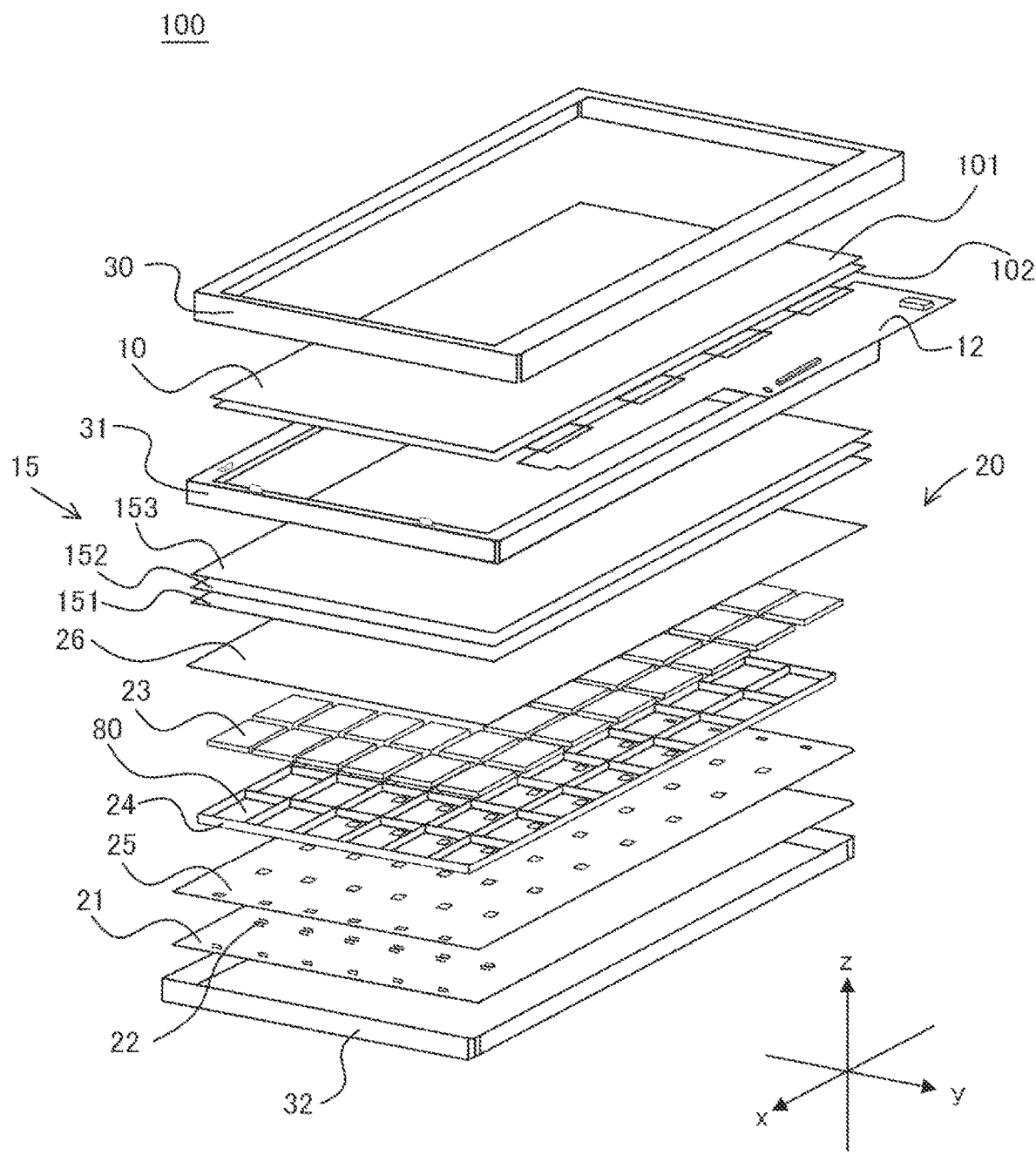
FIG. 1 is an exploded perspective view of a liquid crystal display device according to a first embodiment.

Hereinafter, a planar light source device and a liquid crystal display device using the planar light source device according to an embodiment will be described with reference to the accompanying drawings. In each embodiment, the same components are denoted by the same reference numerals. In each drawing, an x-axis represents a long side direction of a light source substrate included in the planar light source device, a y-axis represents a short side direction of the light source substrate included in the planar light source device, and a z-axis represents a direction orthogonal to a mounting surface of the light source substrate included in the planar light source device.

First Embodiment

FIG. 1 is an exploded perspective view of a liquid crystal display device according to a first embodiment. As illustrated in FIG. 1, a liquid crystal display device 100 includes a display panel 10, an optical sheet group 15, a planar light source device 20, a front frame 30, an intermediate frame 31, and a rear frame 32. The display panel 10 and the planar light source device 20 are contained in a housing having the front frame 30, the intermediate frame 31, and the rear frame 32. In the following description, the front frame 30 side is referred to as a "front face side", and the rear frame 32 side is referred to as a "rear face side" as viewed from each component of the liquid crystal display device. In FIG. 1 and other drawings, the front face side corresponds to the positive direction side of the z axis, and the rear face side corresponds to the negative direction side of the z axis.

As illustrated in FIG. 1, the display panel 10 is a liquid crystal display panel. The display panel 10 includes a first substrate 101, a second substrate 102, and a liquid crystal sandwiched between the first substrate 101 and the second substrate 102. In the first substrate 101, a color filter, a black matrix as a light shielding layer, a counter electrode, and the like are provided on an insulating substrate such as glass. In addition, in the second substrate 102, a pixel electrode, a thin film transistor (TFT) for supplying an image signal to the pixel electrode, and the like are provided on an insulating substrate such as glass. Between the first substrate 101 and the second substrate 102, a spacer that holds the interval, a sealing material that bonds the first substrate 101 and the second substrate 102 together and seals the liquid crystal, an alignment film that aligns the orientation of the liquid crystal, and the like are provided. Further, polarizing plates are provided on an outer front face and a back face of the display panel 10.

A driving IC is mounted on the second substrate 102 of the display panel 10. A circuit board 12 for controlling the driving IC is connected to the display panel 10. The driving IC may be disposed on a tape-shaped wiring substrate (for example, a tape carrier package (TCP), a chip on film (COF), or the like) connected to the outer peripheral portion of the second substrate 102. Furthermore, a touch panel that detects a touch operation by a user and a transparent protective member that protects the touch panel may be installed on the front face side of the display panel 10. In addition, a cover for protecting the circuit board 12 may be provided on the rear face side of the rear frame 32. Then, the display panel 10 transmits or shields light from a planar light source device 20 to be described later, so that an image is displayed on a screen which is a surface on the front face side of the display panel 10.

As illustrated in FIG. 1, the optical sheet group 15 is a plurality of sheet-like members sandwiched between the display panel 10 and the planar light source device 20. In addition, the optical sheet group 15 functions to adjust the intensity distribution and the emission angle of the light emitted from the planar light source device 20. Specifically, the optical sheet group 15 includes a diffusion sheet 151, a prism sheet 152, and a deflection sheet 153 from the rear face side. The diffusion sheet 151 is a sheet-like member for suppressing a stripe pattern phenomenon (moire) generated on the screen of the display panel 10 by the light irradiated from the planar light source device 20. The prism sheet 152 is a sheet-like member that narrows the viewing angle of the light emitted from the planar light source device 20 and improves the luminance of the screen of the display panel 10. The deflection sheet 153 is a sheet-like member in which a function of suppressing moire on a screen of the display panel 10 generated by light passing through the prism sheet 152 is added to a function for adjusting light emitted from the planar light source device 20 to a deflection direction of the display panel 10.

The planar light source device 20 is disposed on the rear face side with respect to the optical sheet group 15, and irradiates the display panel 10 with light via the optical sheet group 15. As illustrated in FIG. 1, the planar light source device 20 according to the first embodiment includes a light source substrate 21, a plurality of light sources 22, a plurality of light guides 23, a partition frame 24, a reflection sheet 25, and a diffusion plate 26.

As illustrated in FIG. 1, the light source substrate 21 is a plate-like member positioned on the most rear face side in the planar light source device 20, and has a rectangular shape. Further, a mounting surface which is a surface on the front face side of the light source substrate 21 is divided into a plurality of light emitting regions 80 by the partition frame 24 to be described later. Each light emitting region 80 has a rectangular shape when viewed from a direction orthogonal to the mounting surface of the light source substrate 21. Further, a plurality of light sources 22 is arranged on the mounting surface of the light source substrate 21. In addition, the light source substrate 21 is provided with wiring so that the light sources 22 can be independently driven in units of one or several. Note that, the long side of the rectangle formed by the light emitting region 80 is parallel to the long side of the rectangle formed by the light source substrate 21, and the short side of the rectangle formed by the light emitting region 80 is parallel to the short side of the rectangle formed by the light source substrate 21.

The light source 22 is a light emitting diode, and a plurality of light sources is arranged on the mounting surface of the light source substrate 21. In addition, the light source 22 emits light in a direction parallel to the long side direction of the rectangle formed by the light source substrate 21. Furthermore, the light source 22 is independently drivable as described above.

The light guide 23 is a rectangular parallelepiped member made of acrylic resin or the like, and has a rectangular shape when viewed from a direction orthogonal to the mounting surface of the light source substrate 21. A plurality of light guides 23 is arranged on a surface on the front face side of the reflection sheet 25 described later. Furthermore, the light guide 23 emits the light emitted from the light source 22 from the emitting surface in the emitting direction (positive direction of the z axis) that is opposite to the direction from the light source 22 toward the light source substrate 21.

The partition frame 24 is made of a resin having high reflectance, for example, polycarbonate. The partition frame 24 forms a lattice when viewed from a direction orthogonal to the mounting surface of the light source substrate 21. Then, the region on the front face side of the light source substrate 21 is divided into a plurality of light emitting regions 80 by the lattice formed by the partition frame 24. The partition frame 24 may be made of, for example, metal or the like, or aluminum or the like may be deposited on the surface of the resin.

The reflection sheet 25 is a sheet-like member sandwiched between the light source substrate 21 and the partition frame 24. A plurality of holes is formed in the reflection sheet 25, and the light source 22 disposed on the surface on the front face side of the light source substrate 21 protrudes from the hole toward the front face side of the reflection sheet 25. Then, out of the light emitted from the light source 22 and emitted through the light guide 23, the light emitted from the surface of the light guide 23 on the light source substrate side, that is, the emitted surface facing the emitting surface is reflected by the reflection sheet 25, returns to the light guide 23 again, and then is emitted from the emitting surface of the light guide 23.

The diffusion plate 26 is disposed on the front face side of the partition frame 24, and is positioned on the most front face side in the planar light source device 20. The diffusion plate 26 is a plate-like member having a rectangular shape when viewed from a direction orthogonal to the mounting surface of the light source substrate. Then, the diffusion plate 26 scatters the light emitted from the plurality of light guides 23 by fine particles inside the diffusion plate 26, and achieves surface emission on a surface on the front face side of the diffusion plate 26.

The planar light source device 20 including the light source substrate 21, the light source 22, the light guide 23, the partition frame 24, the reflection sheet 25, and the diffusion plate 26 is contained in the rear frame 32. The optical sheet group 15 positioned on the front face side of the planar light source device 20 is also contained in the rear frame 32. Then, the intermediate frame 31 is placed on the front face side of the rear frame 32 in which the planar light source device 20 and the optical sheet group 15 are contained, and the display panel 10 is further placed on the front face side of the intermediate frame 31. Then, the front frame 30 is placed on the front face side of the intermediate frame 31 with the display panel 10 sandwiched therebetween, so that the display panel 10 and the planar light source device 20 are contained in a housing including the front frame 30, the intermediate frame 31, and the rear frame 32 to form one liquid crystal display device 100. Note that the intermediate frame 31 is provided with an opening for allowing light emitted from the planar light source device 20 to be incident on the display panel 10, and the front frame 30 is provided with an opening for exposing a display area of the display panel 10.

Figure 2:
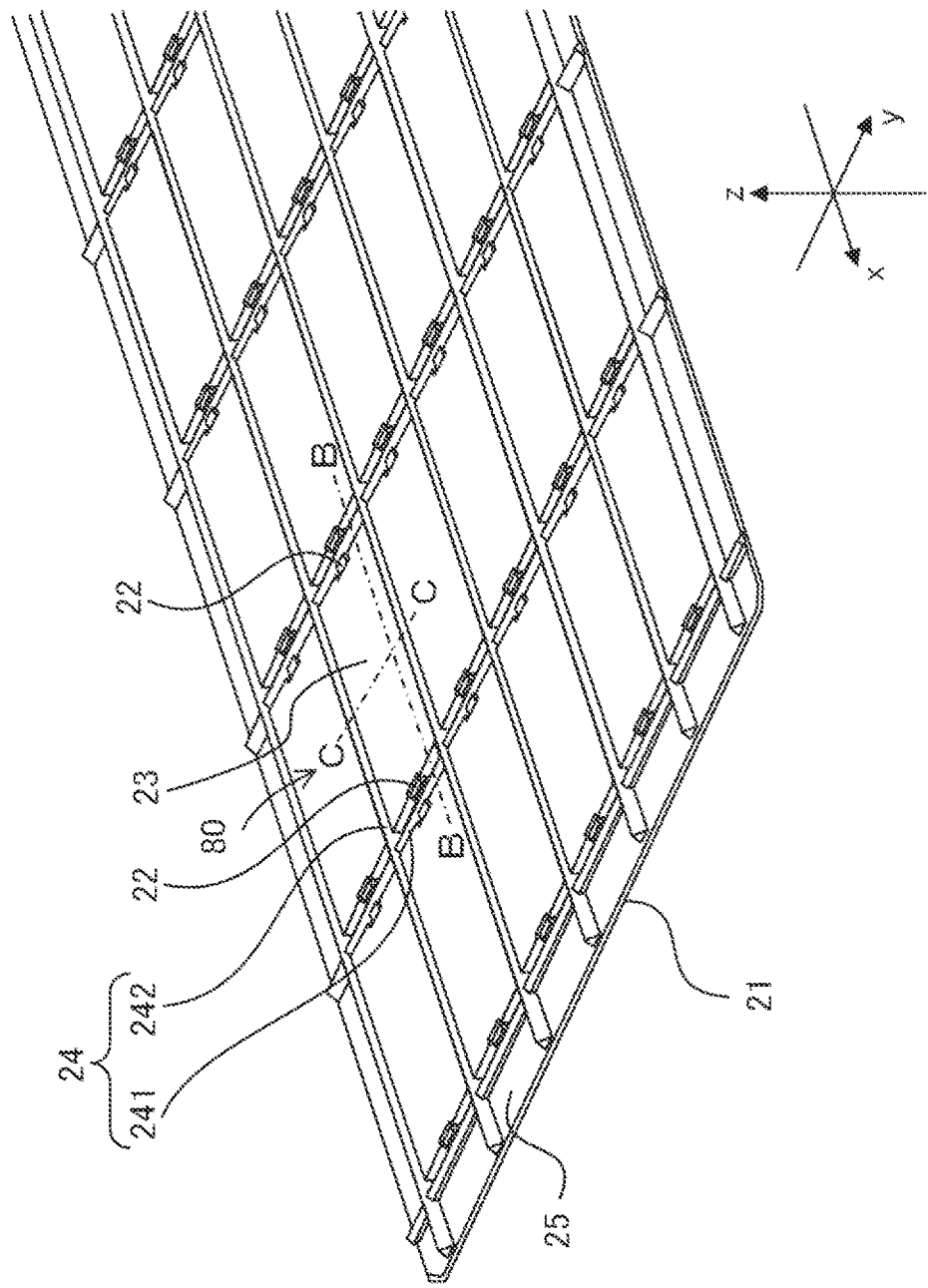
FIG. 2 is a perspective view of a planar light source device according to the first embodiment from which a diffusion plate is removed.
Figure 3:
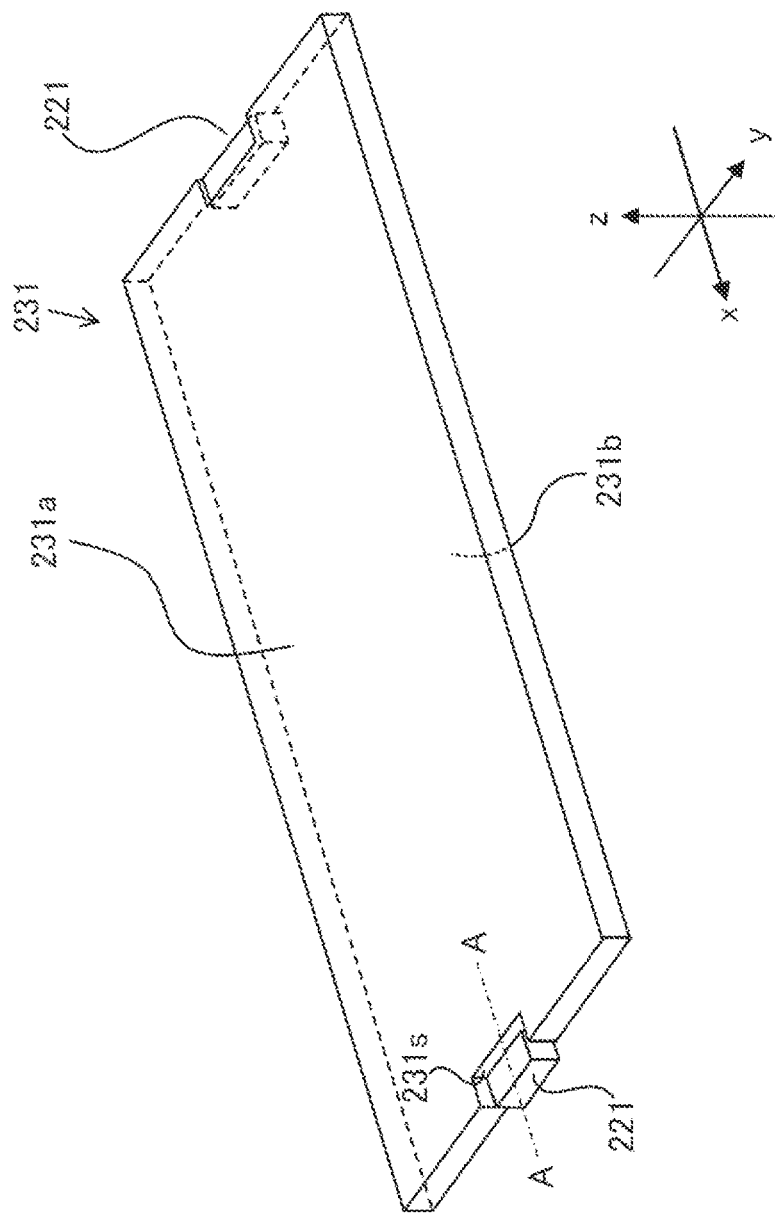
FIG. 3 is a perspective view illustrating a positional relationship between a light source and a light guide according to the first embodiment.
Figure 4:
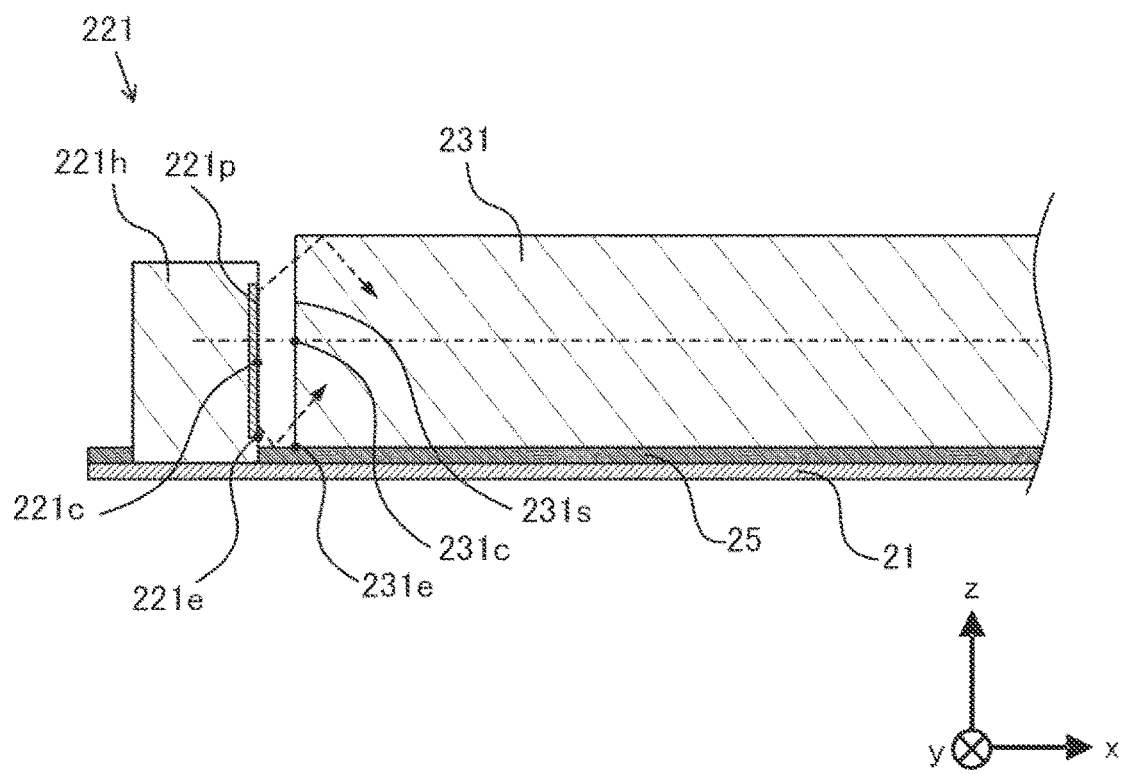
FIG. 4 is a cross-sectional view taken along line A-A of FIG. 3.
Figure 5:
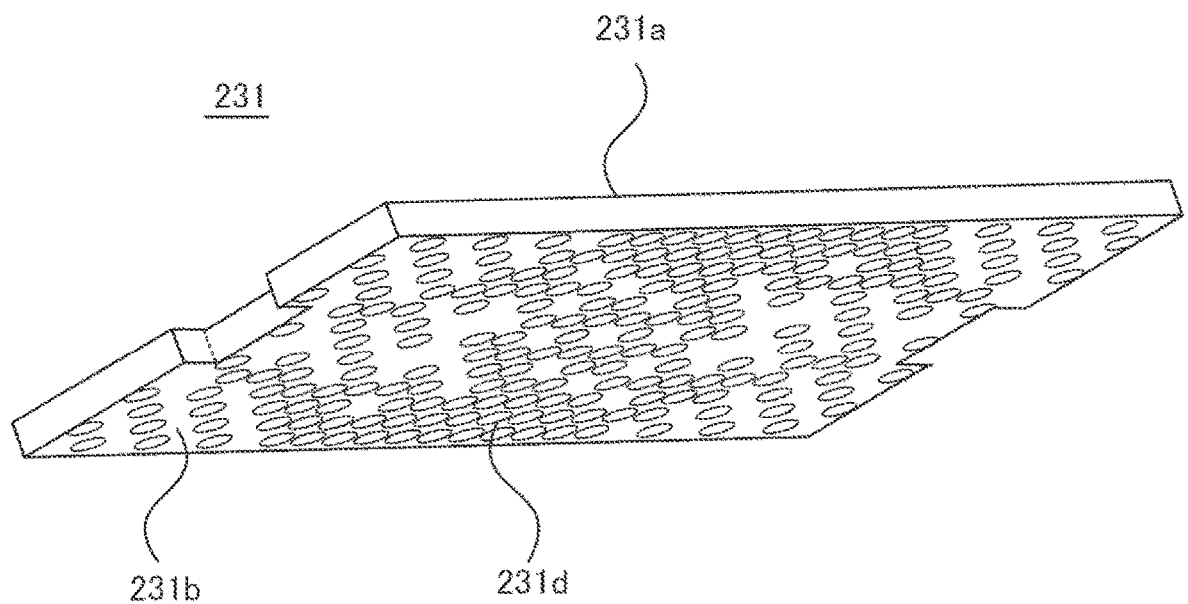
FIG. 5 is a perspective view of a surface on a rear face side of the light guide according to the first embodiment as viewed from the rear face side.
Figure 6:
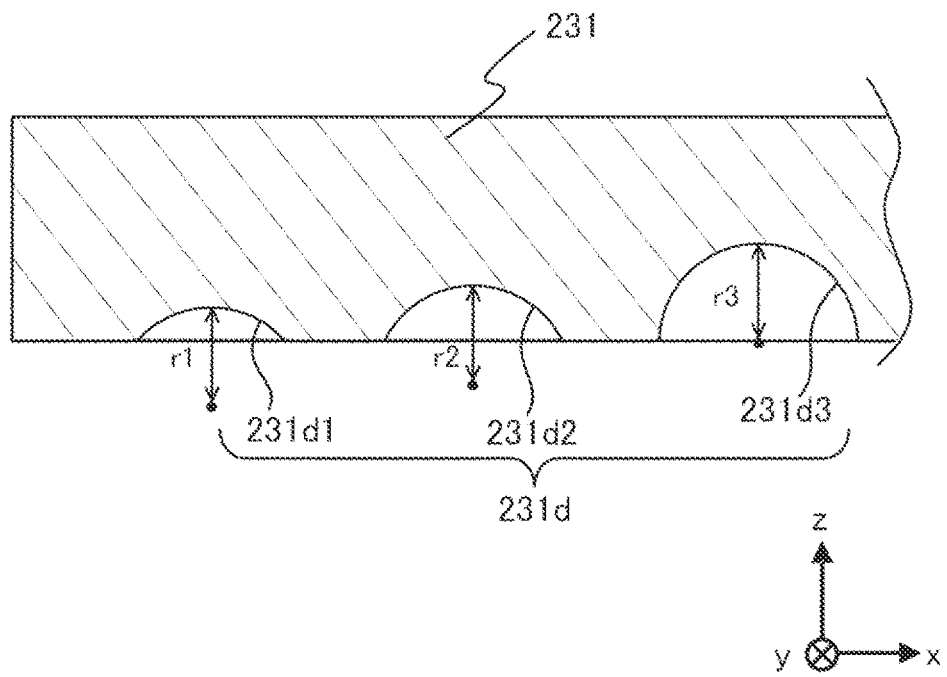
FIG. 6 is a cross-sectional view of a part of the light guide according to the first embodiment cut in a direction orthogonal to a mounting surface of a light source substrate and along a plane parallel to an emitting direction of the light source.
Figure 7:
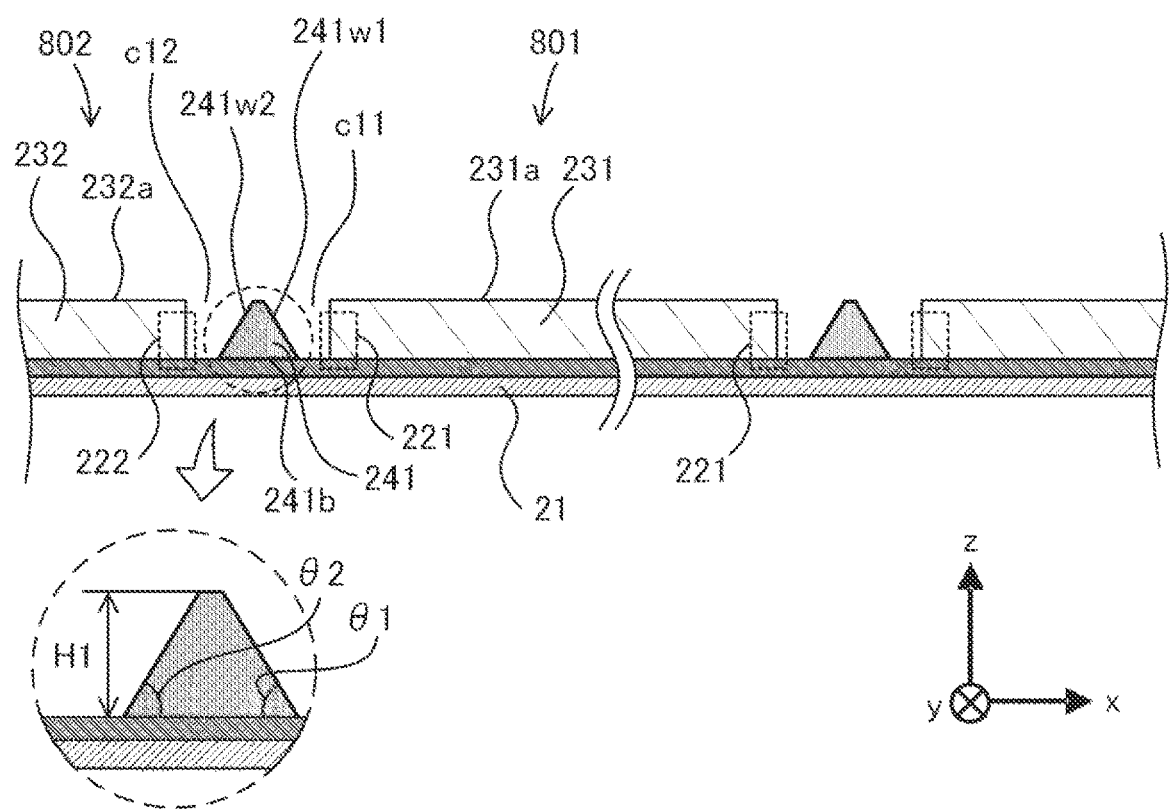
FIG. 7 is a cross-sectional view taken along line B-B in FIG. 2.
Figure 8:
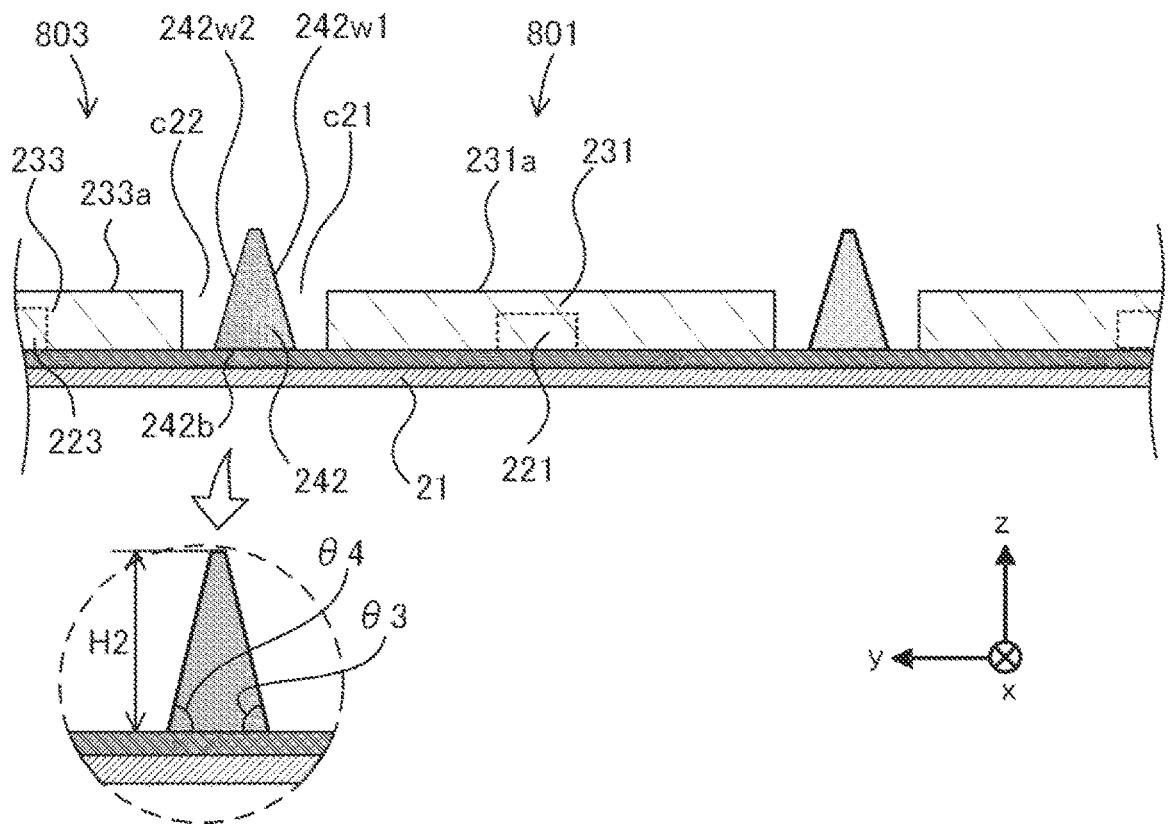
FIG. 8 is a cross-sectional view taken along line C-C in FIG. 2.

Next, the planar light source device 20 according to the first embodiment will be described in more detail. FIG. 2 is a perspective view of the planar light source device according to the first embodiment from which a diffusion plate is removed. FIG. 3 is a perspective view illustrating a positional relationship between the light source and the light guide according to the first embodiment. FIG. 4 is a cross-sectional view taken along line A-A in FIG. 3. FIG. 5 is a perspective view of a surface on the rear face side of the light guide according to the first embodiment as viewed from the rear face side. FIG. 6 is a cross-sectional view of a part of the light guide according to the first embodiment cut in a direction orthogonal to the mounting surface of the light source substrate and along a plane parallel to the emitting direction of the light source. FIG. 7 is a cross-sectional view taken along line B-B in FIG. 2. FIG. 8 is a cross-sectional view taken along line C-C in FIG. 2. In FIG. 4, a path of light emitted from the light source is indicated by a broken line. In FIG. 7, the light source is indicated by a broken line in order to help understand the positional relationship between a member whose cross section is illustrated and the light source. Also in FIG. 8, the light source is indicated by a broken line.

As illustrated in FIG. 2, the reflection sheet 25 is positioned on a mounting surface which is a surface on a front face side of the light source substrate 21. Furthermore, a plurality of light guides 23 and partition frames 24 are positioned on a surface on the front face side of the reflection sheet 25. In addition, although the light sources 22 are arranged on the mounting surface of the light source substrate 21, as described above, the light sources protrude from the plurality of holes provided in the reflection sheet 25 toward the front face side of the reflection sheet 25. As a result, the light sources 22 and the light guides 23 are arranged in a direction parallel to the mounting surface. Further, the partition frames 24 include a plurality of first partition walls 241 arranged in the long side direction of the light source substrate 21 and a plurality of second partition walls 242 arranged in the short side direction of the light source substrate 21. Accordingly, the partition wall of the partition frame 24 includes a first partition wall 241 and a second partition wall 242. The partition frame 24 forms a lattice by the first partition wall 241 and the second partition wall 242. The region on the front face side of the light source substrate 21 is divided into a plurality of light emitting regions 80 by the partition frames 24 forming a lattice.

As illustrated in FIG. 2, two light sources 22 are arranged for each light emitting region 80. Specifically, one light source 22 is disposed along each short side of the rectangle formed by one light emitting region 80. In addition, the two light sources 22 arranged in one light emitting region 80 face each other and are arranged so as to sandwich one light guide 23. Then, the two light sources 22 irradiate the light guide 23 sandwiched between the two light sources 22 with light. That is, the two light sources 22 arranged in one light emitting region 80 emit light in directions opposite to each other.

As illustrated in FIG. 2, one light guide 23 is disposed for one light emitting region 80. The light guide 23 is provided with a groove in which the light source 22 is contained. Here, a first light source 221 included in the plurality of light sources 22 included in the planar light source device 20 and a first light guide 231 included in the plurality of light guides 23 will be specifically described as an example. As illustrated in FIG. 3, grooves are provided on both the side faces of the first light guide 231 other than a first emitting surface 231a positioned on the front face side and a counter-emitting surface 231b positioned on the rear face side, that is, on two side faces of the first light guide 231 positioned on the short-side side of the rectangular parallelepiped formed by the first light guide 231. The first light source 221 is contained in the groove. Hereinafter, a surface of the groove in the side face of the first light guide 231 on which the light from the first light source 221 is incident is referred to as an incident surface 231s.

In addition, as illustrated in FIG. 4, a light emitting surface 221p that emits light is provided on a surface of the first light source 221 facing the incident surface 231s of the first light guide 231. The light emitting surface 221p is surrounded by a housing 221h. In the direction (z-axis direction) orthogonal to the mounting surface of the light source substrate 21, a center 221c of the light emitting surface 221p is closer to the light source substrate 21 than a center 231c of the incident surface 231s of the first light guide 231. Furthermore, in the direction orthogonal to the mounting surface of the light source substrate 21, the position of an end 221e of the light emitting surface 221p positioned on the light source substrate side is positioned on the front face side with respect to the position of an end 231e of the incident surface 231s of the first light guide 231 positioned on the light source substrate side, that is, is far from the light source substrate 21.

In addition, as illustrated in FIG. 5, a plurality of depressed portions 231d is provided on the counter-emitting surface 231b that is a surface facing the first emitting surface 231a of the first light guide 231. The depressed portion 231d reflects the light incident on the first light guide 231. Most of the light reflected by the plurality of depressed portions 231d travels toward the first emitting surface 231a. The depths of the plurality of depressed portions 231d are not all the same. For example, as illustrated in FIG. 6, a first depressed portion 231d1, a second depressed portion 231d2, and a third depressed portion 231d3 included in the plurality of depressed portions 231d have different depths. However, a curvature radius r1 of the spherical surface formed by the surface of the first depressed portion 231d1, a curvature radius r2 of the spherical surface formed by the surface of the second depressed portion 231d2, and a curvature radius r3 of the spherical surface formed by the surface of the third depressed portion 231d3 are the same. That is, the shapes of the surfaces of the plurality of depressed portions 231d are spherical surfaces having the same radius of curvature. In addition, the depth of the depressed portion 231d increases from the depressed portion 231d positioned on an incident surface side of the first light guide 231 toward the depressed portion 231d positioned on the center side of the first light guide 231. For example, the depth of the third depressed portion 231d3 positioned on the center side of the first light guide 231 is deeper than that of the first depressed portion 231d1. This is because more light is reflected on the center side of the first light guide 231 where light from the first light source 221 is less likely to reach than on the incident surface side. Note that the spherical surface formed by the surfaces of the plurality of depressed portions 231d means a spherical surface in a range possible in manufacturing the light guide, and does not mean a perfect spherical surface.

As described above, the partition frame 24 divides the front face side of the light source substrate 21, that is, the mounting surface, into the plurality of light emitting regions 80. Further, the partition wall of the partition frame 24 includes the first partition wall 241 facing the first light source 221 with the first light guide 231 sandwiched between the first partition wall 241 and the first light source 221, and the second partition wall 242 intersecting the first partition wall 241. Here, with respect to the first partition wall 241 and the second partition wall 242 of the partition frame 24, the first light source 221 and second light sources 222 and 223 included in the plurality of light sources 22, and the first light guide 231 and second light guides 232 and 233 included in the plurality of light guides 23 will be specifically described as an example.

As illustrated in FIG. 7, the first partition wall 241 is positioned between the first light guide 231 and the second light guide 232 included in the plurality of light guides 23, and partitions a first light emitting region 801 in which the first light guide 231 is contained and a second light emitting region 802 in which the second light guide 232 is contained. The first light guide 231 emits light incident from the first light source 221 from the first emitting surface 231a positioned on the front face side in an emitting direction opposite to the direction from the first light source 221 toward the light source substrate 21. In addition, the second light guide 232 emits light incident from the second light source 222 from a second emitting surface 232a positioned on the front face side in an emitting direction opposite to the direction from the second light source 222 toward the light source substrate 21. Further, the second light guide 232 is contained in the second light emitting region 802 adjacent to the first light emitting region 801 containing the first light guide 231 on the mounting surface of the light source substrate 21. Here, the first partition wall 241 is provided with a gap c11 from the first emitting surface 231a of the first light guide 231. In addition, an angle θ1 formed by a wall surface 241w1 of the first partition wall 241 on the first light guide 231 side and a bottom face 241b of the first partition wall 241 is an acute angle, that is, less than 90 degrees. In addition, the first partition wall 241 is provided with a gap c12 from the second emitting surface 232a of the second light guide 232. In addition, an angle θ2 formed by a wall surface 241w2 of the first partition wall 241 on the second light guide side and the bottom face 241b of the first partition wall 241 is an acute angle, that is, less than 90 degrees.

As illustrated in FIG. 8, the second partition wall 242 is positioned between the first light guide 231 and the second light guide 233 included in the plurality of light guides 23, and partitions the first light emitting region 801 in which the first light guide 231 is contained and a second light emitting region 803 in which the second light guide 233 is contained. Here, the second light guide 233 emits light incident from the second light source 223 from a second emitting surface 233a positioned on the front face side in an emitting direction opposite to the direction from the second light source 223 toward the light source substrate 21. Further, the second light guide 233 is contained in the second light emitting region 803 adjacent to the first light emitting region 801 in which the first light guide 231 is contained on the mounting surface. The second partition wall 242 is provided with a gap c21 from the first emitting surface 231a of the first light guide 231. In addition, an angle θ3 formed by a wall surface 242w1 of the second partition wall 242 on the first light guide side and a bottom face 242b of the second partition wall 242 is an acute angle, that is, less than 90 degrees. In addition, the second partition wall 242 is provided with a gap c22 from the second emitting surface 233a of the second light guide 233. In addition, an angle θ4 formed by a wall surface 242w2 of the second partition wall 242 on the second light guide side and the bottom face 242b of the second partition wall 242 is an acute angle, that is, less than 90 degrees. Note that an emitting direction of the first light guide 231 is the same as an emitting direction of the second light guides 232, 233.

Furthermore, as illustrated in FIGS. 7 and 8, the shape of the first partition wall 241 is different from the shape of the second partition wall 242. Specifically, the angle θ1 formed by the wall surface 241w1 and the bottom face 241b of the first partition wall 241 is smaller than the angle θ3 formed by the wall surface 242w1 and the bottom face 242b of the second partition wall 242 intersecting the first partition wall 241 or the angle θ4 formed by the wall surface 242w2 and the bottom face 242b. The angle θ2 formed by the wall surface 241w2 and the bottom face 241b of the first partition wall 241 is smaller than the angle θ3 formed by the wall surface 242w1 and the bottom face 242b of the second partition wall 242 intersecting the first partition wall 241 or the angle θ4 formed by the wall surface 242w2 and the bottom face 242b. In the direction orthogonal to the mounting surface of the light source substrate 21, a height H2 of the second partition wall 242 is higher than a height H1 of the first partition wall 241. As will be described later, since more light in a direction toward the front face side reaches the second partition wall 242 than the first partition wall 241, the height of the second partition wall is set as high as possible. At this time, since it is desired to reduce the width of the partition wall as much as possible, as a result, the angle formed by each wall surface and the bottom face 242b of the second partition wall 242 is larger than the angle formed by each wall surface and the bottom face 241b of the first partition wall 241.

In the planar light source device 20 and the liquid crystal display device 100 including the planar light source device 20 according to the first embodiment configured as described above, the light emitted by turning on the light source 22 is emitted from the emitting surface of the light guide 23 via the light guide 23. The emitted light is scattered by fine particles inside the diffusion plate 26, and surface emission is achieved on a surface on the front face side of the diffusion plate 26. The light by the surface emission is irradiated to the display panel 10 via the optical sheet group 15. Then, the display panel 10 partially shields or transmits the light with which the display panel 10 is irradiated, whereby an image is displayed on a screen which is a surface on the front face side of the display panel 10. At this time, local dimming is performed by independently controlling the brightness of the light source 22 in each light emitting region in the planar light source device 20 in accordance with the brightness of the image to be displayed.

Figure 9:
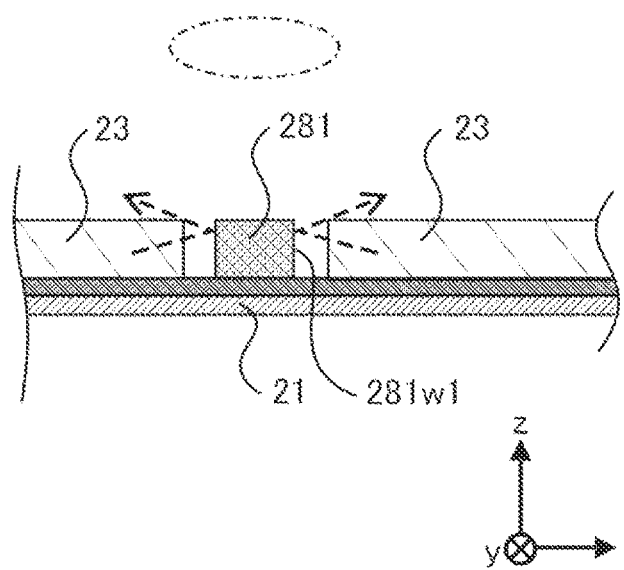
FIG. 9 is a view illustrating a cross section around a partition frame and a path of light reflected by the partition frame of a planar light source device according to a comparative example.
Figure 10:
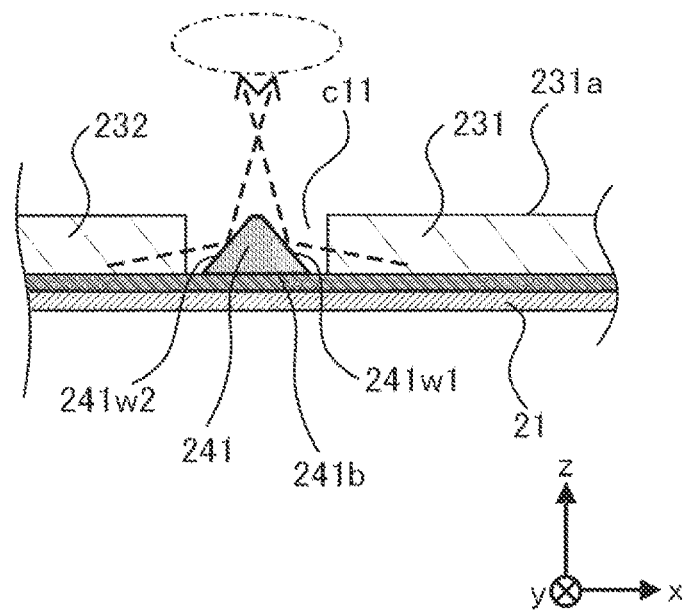
FIG. 10 is a view illustrating a cross section around a partition frame and a path of light reflected by the partition frame of the planar light source device according to the first embodiment.
Figure 11:
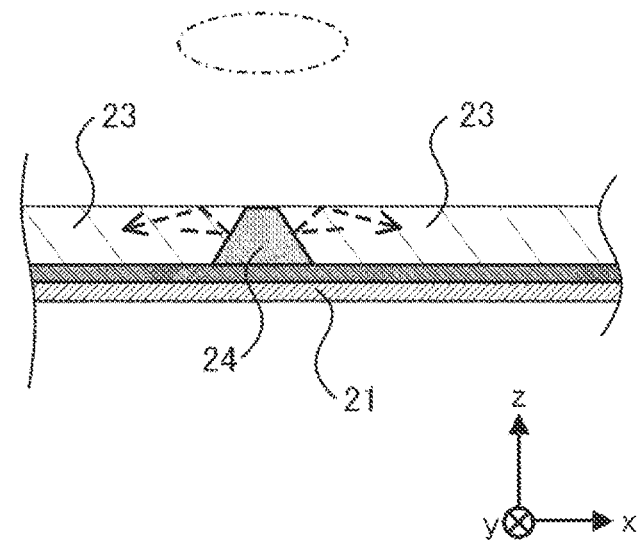
FIG. 11 is a view illustrating a cross section around a partition frame and a path of light reflected by the partition frame of a planar light source device according to a comparative example.
Figure 12:
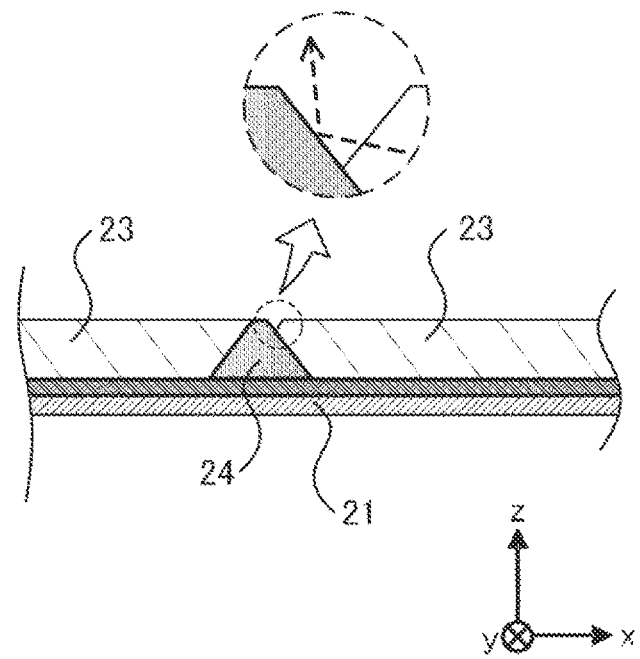
FIG. 12 is a view illustrating a cross section around a partition frame and a path of light reflected by the partition frame of a planar light source device according to a modification of the first embodiment.
Figure 13:
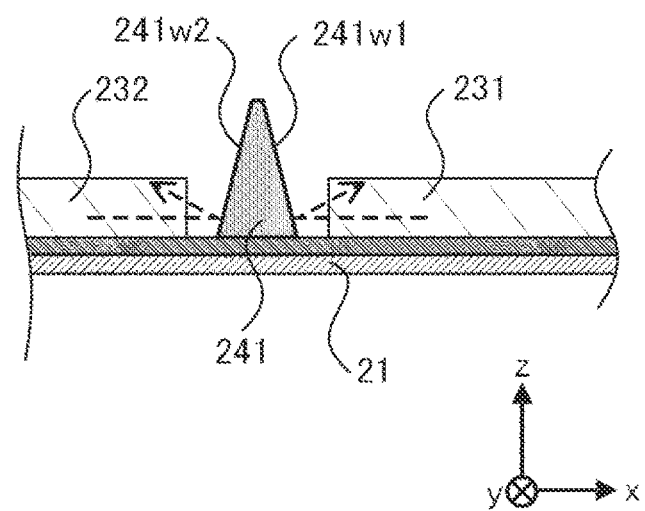
FIG. 13 is a view illustrating a cross section around a partition frame and a path of light reflected by the partition frame of a planar light source device according to a comparative example.
Figure 14:
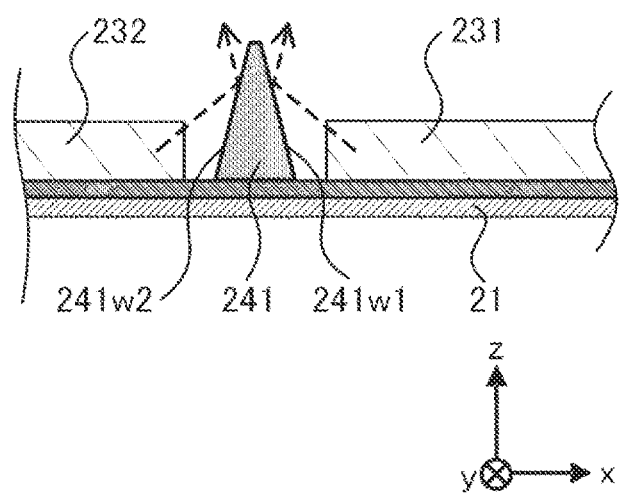
FIG. 14 is a view illustrating a cross section around a partition frame and a path of light reflected by the partition frame of the planar light source device according to the first embodiment.
Figure 15:
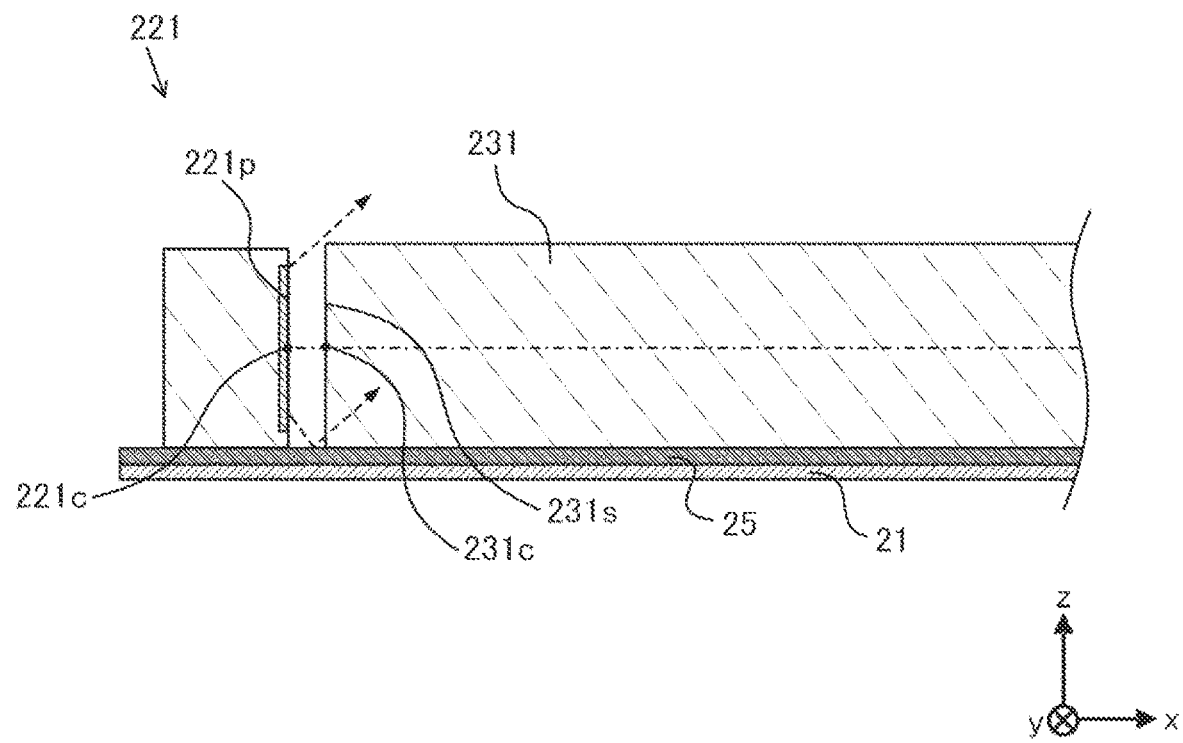
FIG. 15 is a view illustrating a cross section around a light source and a path of light emitted from the light source of a planar light source device according to a comparative example.
Figure 16:
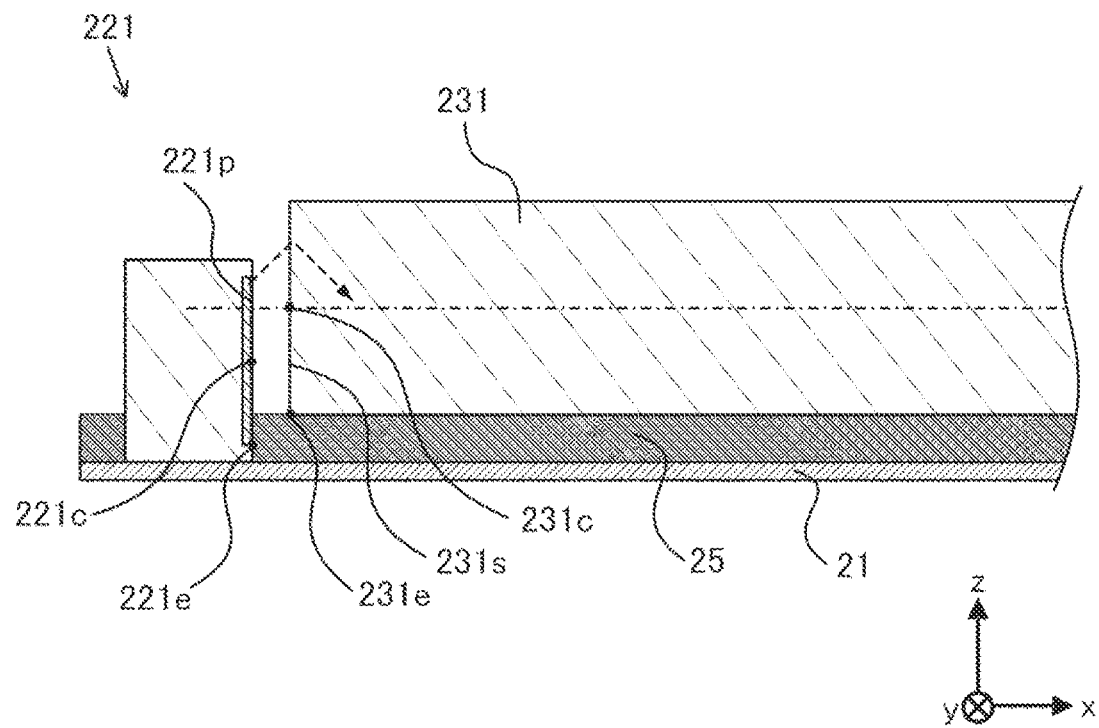
FIG. 16 is a view illustrating a cross section around a light source and a path of light emitted from the light source of a planar light source device according to a comparative example.

Next, effects of the planar light source device 20 and the liquid crystal display device 100 including the planar light source device 20 according to the first embodiment will be described with reference to the drawings. FIG. 9 is a view illustrating a cross section around a partition frame and a path of light reflected by the partition frame of a planar light source device according to a comparative example. FIG. 10 is a view illustrating a cross section around a partition frame and a path of light reflected by the partition frame of the planar light source device 20 according to the first embodiment. FIG. 11 is a view illustrating a cross section around a partition frame and a path of light reflected by the partition frame of a planar light source device according to a comparative example. FIG. 12 is a view illustrating a cross section around a partition frame and a path of light reflected by the partition frame of a planar light source device according to a modification of the first embodiment. FIG. 13 is a view illustrating a cross section around a partition frame and a path of light reflected by the partition frame of a planar light source device according to a comparative example. FIG. 14 is a view illustrating a cross section around a partition frame and a path of light reflected by the partition frame of the planar light source device 20 according to the first embodiment. FIG. 15 is a diagram illustrating a cross section around a light source and a path of light emitted from the light source of a planar light source device according to a comparative example. FIG. 16 is a diagram illustrating a cross section around a light source and a path of light emitted from the light source of a planar light source device according to a comparative example. In FIGS. 9 to 16, the light path is indicated by a broken line arrow.

As illustrated in FIG. 9, the partition frame of the planar light source device according to the comparative example includes a partition wall 281 provided with a wall surface 281w1 parallel to a direction orthogonal to the mounting surface of the light source substrate 21. In such a planar light source device, the light leaking out to the partition frame through the light guide 23 is reflected by the wall surface 281w1 of the partition wall 281, and then travels toward the light emitting region in which the light guide 23 through which the light passes is contained or the inside of the light guide 23 through which the light passes. In this case, since the light does not travel toward the region on the front face side with respect to the partition wall 281 indicated by the ellipse of the one-dot chain line in FIG. 9, that is, the region on the front face side with respect to the partition frame, there is a possibility that the partition frame portion becomes dark and the partition frame appears as a dark line on the display screen. On the other hand, in the first partition wall 241 of the partition frame 24 of the planar light source device 20 according to the first embodiment, as illustrated in FIG. 10, the light leaking out to the partition frame 24 through the first light guide 231 included in the light guide 23 is reflected by the wall surface 241w1 of the first partition wall 241. At this time, the angle formed by the wall surface 241w1 and the bottom face 241b is an acute angle. As a result, the wall surface 241w1 faces the front face side. As a result, the light leaking from the first light guide 231 to the partition frame 24 is reflected by the wall surface 241w1 of the first partition wall 241 toward the region on the front face side with respect to the first partition wall 241 indicated by the ellipse of the one-dot chain line in FIG. 10, that is, the region on the front face side with respect to the partition frame 24. Here, as in the planar light source device according to the comparative example illustrated in FIG. 11, when there is no gap between the emitting surface of the light guide 23 and the partition wall of the partition frame 24, most of the light traveling from the light guide 23 toward the partition frame 24 is reflected by the wall surface of the partition wall of the partition frame 24 and then returns to the inside of the light guide 23 again. However, in the planar light source device 20 according to the first embodiment, as illustrated in FIG. 10, since the gap c11 is provided between the first emitting surface 231a of the first light guide 231 and the first partition wall 241 of the partition frame 24, the light reflected by the wall surface 241w1 can travel from the gap c11 to the region on the front face side with respect to the partition frame 24 without returning to the first light guide 231. As a result, in the planar light source device 20 and the liquid crystal display device 100 including the planar light source device 20 according to the first embodiment, the darkening of the partition frame portion can be suppressed. Note that, as illustrated in FIG. 12, if the gap c11 is provided even slightly between the first emitting surface 231a of the first light guide 231 and the first partition wall 241 of the partition frame 24, the light can travel from there toward the region on the front face side with respect to the partition frame 24, so that the effect of suppressing the darkening of the partition frame portion can be obtained. Of course, the larger the gap c11 between the first emitting surface 231a of the first light guide 231 and the first partition wall 241 of the partition frame 24, the greater the above-described effect. Furthermore, in the above description, the light reflected by the wall surface 241w1 of the first partition wall 241 of the partition frame 24 has been described as an example, but the light reflected by the wall surface 241w2 also travels toward the region on the front face side of the partition frame 24 by the same principle as the light reflected by the wall surface 241w1. As a result, the wall surface 241w2 also contributes to suppressing the darkening of the partition frame portion. In addition, each wall surface of the second partition wall 242 also contributes to suppressing the darkening of the partition frame portion by the same principle as the wall surfaces 241w1, 241w2.

In the planar light source device 20 and the liquid crystal display device 100 including the planar light source device 20 according to the first embodiment, the angle θ1 formed by the wall surface 241w1 and the bottom face 241b of the first partition wall 241 is smaller than the angle θ3 formed by the wall surface 242w1 and the bottom face 242b of the second partition wall 242 intersecting the first partition wall 241. Thus, the light from the light guide can be efficiently reflected to the region on the front face side with respect to the partition frame. Specifically, since the first partition wall 241 faces the first light source 221 across the first light guide 231, as compared with the second partition wall 242, more light traveling at an angle close to parallel to the mounting surface of the light source substrate 21 reaches the wall surface 241w1 of the first partition wall 241 without changing the direction inside the first light guide 231. In this case, as illustrated in FIG. 13, when the wall surface 241w1 of the first partition wall 241 is brought closer to the direction (the plane parallel to the z axis in FIG. 13) orthogonal to the mounting surface of the light source substrate 21 than the wall surface 242w1 of the second partition wall 242, most of the light having reached the first partition wall 241 travels toward the first light guide 231 through which the light passes. In this case, most of the light coming from the first light guide 231 cannot be guided to the region on the front face side with respect to the partition frame 24. However, in the planar light source device 20 and the liquid crystal display device 100 including the planar light source device 20 according to the first embodiment, the angle θ1 formed by the wall surface 241w1 and the bottom face 241b of the first partition wall 241 is smaller than the angle θ3 formed by the wall surface 242w1 and the bottom face 242b of the second partition wall 242 intersecting the first partition wall 241. As a result, it becomes possible to reflect more light coming from the first light guide 231 toward the region on the front face side with respect to the partition frame 24 as compared with the case where the wall surface 241w1 of the first partition wall 241 is brought closer to the direction orthogonal to the mounting surface of the light source substrate 21 than the wall surface 242w1 of the second partition wall 242. For the above reason, in the planar light source device 20 and the liquid crystal display device 100 including the planar light source device 20 according to the first embodiment, it is possible to reflect efficiently the light from the light guide to the region on the front face side with respect to the partition frame as compared with the case where the wall surface 241w1 of the first partition wall 241 is brought closer to the direction orthogonal to the mounting surface of the light source substrate 21 than the wall surface 242w1 of the second partition wall 242. Note that, although the wall surface 241w1 of the first partition wall 241 of the partition frame 24 has been described above as an example, since the angle θ2 formed by the wall surface 241w2 and the bottom face 241b of the wall surface 241w2 is also smaller than the angle θ3 formed by the wall surface 242w1 and the bottom face 242b of the second partition wall 242 and the angle θ4 formed by the wall surface 242w2 and the bottom face 242b, it is possible to reflect more light traveling at an angle close to parallel with the mounting surface than each wall surface of the second partition wall 242, and to reflect efficiently the light from the light guide to the region on the front face side with respect to the partition frame.

In addition, as described above, since the first partition wall 241 faces the first light source 221 across the first light guide 231, as compared with the second partition wall 242, more light traveling at an angle close to parallel to the mounting surface of the light source substrate 21 reaches the first partition wall 241 without changing the direction inside the first light guide 231 or the second light guide 232. That is, compared with the first partition wall 241, a larger proportion of light, the direction of which has been changed inside the first light guide 231, reaches the second partition wall 242. At this time, as illustrated in FIG. 14, a larger proportion of light traveling toward the front face side (the positive direction side of the z axis) reaches the second partition wall 242 than the light reaching the first partition wall 241. Here, when the height of the second partition wall 242 is set to be lower than the height of the first partition wall 241, it becomes difficult to reflect most of light by the second partition wall. To cope with this, in the planar light source device 20 and the liquid crystal display device 100 including the planar light source device 20 according to the first embodiment, the height of the second partition wall 242 is set to be higher than the height of the first partition wall 241 in the direction orthogonal to the mounting surface of the light source substrate 21. As a result, it becomes possible to efficiently reflect the light coming from the first light guide 231 toward the region on the front face side with respect to the partition frame 24 as compared with the case where the height of the second partition wall 242 is set to be lower than the height of the first partition wall 241. For the above reason, in the planar light source device 20 and the liquid crystal display device 100 including the planar light source device 20 according to the first embodiment, it is possible to efficiently reflect the light coming from the light guide toward the region on the front face side with respect to the partition frame as compared with the case where the height of the second partition wall 242 is set to be lower than the height of the first partition wall 241.

In addition, in the planar light source device 20 and the liquid crystal display device 100 including the planar light source device 20 according to the first embodiment, the light emitted from the light source 22 can be efficiently made incident on the light guide 23. When the first light source 221 included in the plurality of light sources 22 and the first light guide 231 included in the plurality of light guides 23 are specifically described as an example, it is necessary to provide a gap between the light emitting surface 221p from which the first light source 221 emits light and the incident surface 231s of the first light guide 231 in consideration of assembly and thermal expansion of each member. Here, as illustrated in FIG. 15, in a case where the position of the center 221c of the light emitting surface 221p of the first light source 221 and the position of the center 231c of the incident surface 231s of the first light guide 231 are the same in the direction orthogonal to the mounting surface of the light source substrate 21, a part of the light emitted from the first light source 221 is not incident on the first light guide 231 but travels toward a region on the front face side of the first light guide 231. Therefore, in the planar light source device 20 according to the first embodiment, the center 221c of the light emitting surface 221p of the first light source 221 is closer to the light source substrate than the center 231c of the incident surface 231s of the first light guide 231 in the direction orthogonal to the mounting surface of the light source substrate 21 (see FIG. 4). As a result, a part of the light emitted from the first light source 221 and having traveled toward the region on the front face side of the first light guide 231 without being incident on the first light guide 231 can be made incident on the first light guide 231. As a result, in the planar light source device 20 according to the first embodiment, more light can be made incident on the first light guide 231 from the first light source 221 than when the center 221c of the light emitting surface 221p of the first light source 221 is positioned at the same position in the direction orthogonal to the mounting surface of the light source substrate 21 with respect to the center 231c of the incident surface 231s of the first light guide 231, or farther from the light source substrate. The light emitted from the first light source 221 and traveling toward the rear face side of the first light guide 231 is reflected by the reflection sheet 25 and is incident on the first light guide 231. At this time, even if the reflection sheet 25 is not provided, the light emitted from the first light source 221 and traveling toward the light source substrate side of the first light guide 231 is reflected by the light source substrate 21 and is incident on the first light guide 231. In addition, for example, in a case where the thickness of the reflection sheet 25 is large and the position of the end 221e of the light emitting surface 221p positioned on the light source substrate side is closer to the light source substrate than the position of the end 231e of the incident surface 221s positioned on the light source substrate side in the direction orthogonal to the mounting surface of the light source substrate 21 as illustrated in FIG. 16, a part of the light emitting surface 221p of the first light source 221 does not face the incident surface 231s of the first light guide 231, so that the light emitted from the first light source 221 does not sufficiently reach the first light guide 231. However, in the planar light source device 20 according to the first embodiment, in the direction orthogonal to the mounting surface of the light source substrate 21, the position of the end 221e of the light emitting surface 221p positioned on the light source substrate side is farther from the mounting surface than the position of the end 231e of the incident surface 231s positioned on the light source substrate side. Therefore, in the planar light source device 20 according to the first embodiment, since the light emitting surface 221p of the first light source 221 faces the incident surface 231s of the first light guide 231, it is possible to suppress a situation in which a part of the light emitted from the first light source 221 does not reach the first light guide 231.

Furthermore, in the planar light source device 20 according to the first embodiment, the plurality of depressed portions 231d having different depths is provided on the counter-emitting surface 231b, which is a surface facing the emitting surface of the first light guide 231. Here, the shapes of the surfaces of the plurality of depressed portions 231d are spherical surfaces having the same radius of curvature. Thus, when the plurality of depressed portions 231d is formed by cutting, it is not necessary to use a different tool for each depressed portion having a different depth, and the plurality of depressed portions 231d having different depths can be formed in the first light guide 231 only by changing the cutting depth.

Second Embodiment

Figure 17:
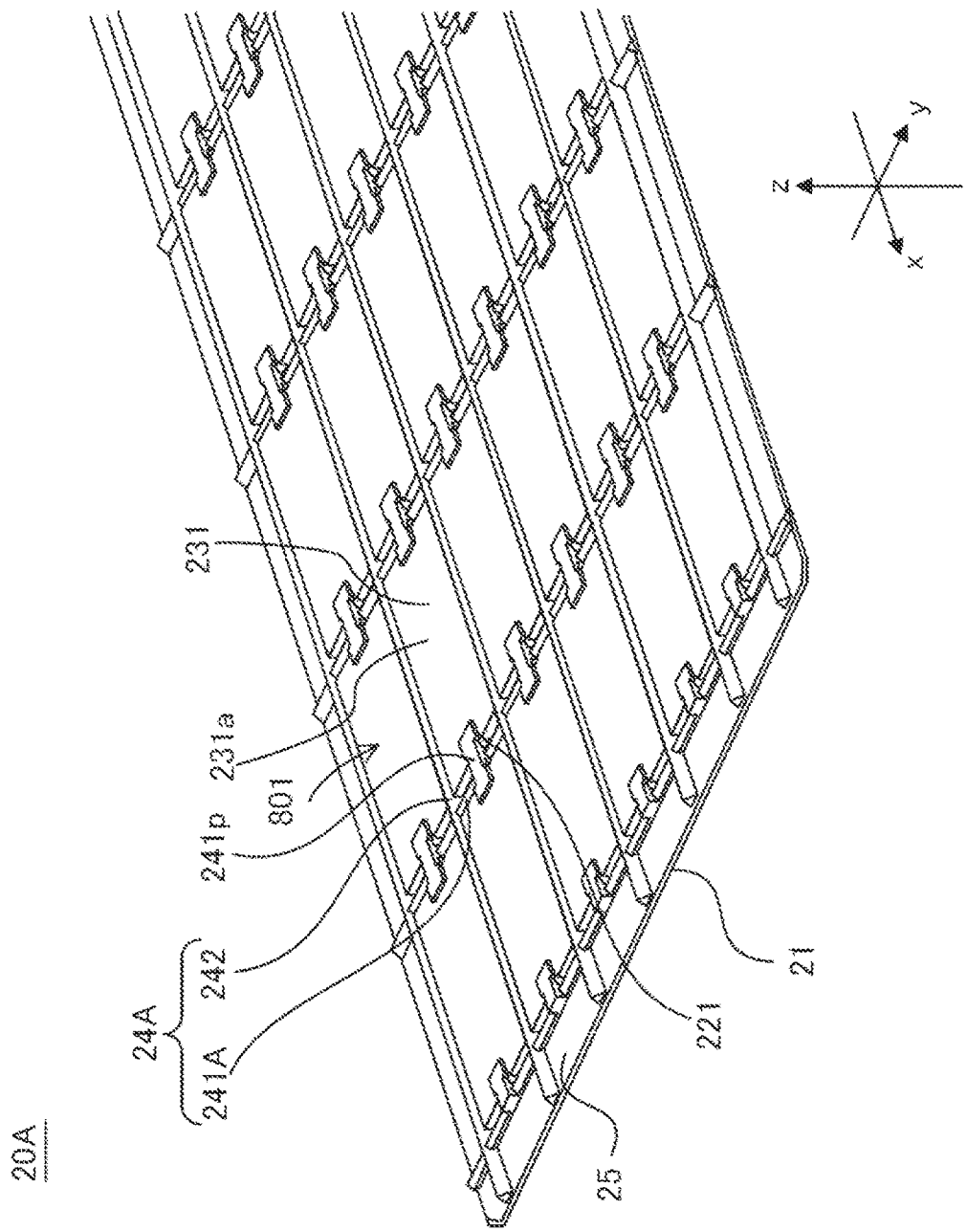
FIG. 17 is a perspective view of a planar light source device of a liquid crystal display device according to a second embodiment from which a diffusion plate is removed.

FIG. 17 is a perspective view of a planar light source device 20A of the liquid crystal display device according to a second embodiment from which a diffusion plate is removed. A difference between the planar light source device 20A of the liquid crystal display device according to the second embodiment and the planar light source device 20 of the liquid crystal display device according to the first embodiment is a partition wall of a partition frame. Therefore, the reference numeral of the partition frame according to the second embodiment is 24A, and among the partition walls included in the partition frame 24A, the reference numeral of the partition wall changed from the first embodiment is 241A.

The partition frame 24A according to the second embodiment includes a first partition wall 241A facing the first light source 221 with the first light guide 231 sandwiched between the first partition wall 241A and the first light source 221, and the second partition wall 242 intersecting the first partition wall 241A. As illustrated in FIG. 17, the first partition wall 241A has a protrusion 241p. The protrusion 241p protrudes from the first partition wall 241A toward the first emitting surface 231a of the first light guide 231. When viewed from a direction orthogonal to the mounting surface of the light source substrate 21, a part of the protrusion 241p overlaps the first light guide 231. Further, the protrusion 241p overlaps the first light source 221 when viewed from a direction orthogonal to the mounting surface of the light source substrate 21. Note that the first partition wall 241A corresponds to the first partition wall 241 according to the first embodiment, and has the same configuration as the first partition wall 241 except for having the protrusion 241p. The second partition wall 242 is not changed from that of the first embodiment. Furthermore, the protrusion 241p may be a member formed integrally with the first partition wall 241A, or may be a member different from the first partition wall 241A and fixed to the first partition wall 241A.

Since the first partition wall 241A has the protrusion 241p as described above, even if the first light guide 231 is about to come off the first light emitting region 801 partitioned by the partition frame 24 due to vibration or the like, the protrusion 241p is at a position overlapping the first light guide 231 when viewed from a direction orthogonal to the mounting surface of the light source substrate 21, and thus the protrusion 241p functions as a stopper. As a result, in the planar light source device 20A of the liquid crystal display device according to the second embodiment, it is possible to suppress the first light guide 231 from falling off or missing from the first light emitting region 801 due to vibration or the like.

Out of light emitted from the light source 22, the light traveling toward the front face side without passing through the light guide 23 may appear on the display panel as a spot having higher luminance than the light emitted from the light guide 23. However, in the planar light source device 20A according to the second embodiment, the protrusion 241p of the first partition wall 241A of the partition frame 24A is provided at the position overlapping the first light source 221 when viewed from the direction orthogonal to the mounting surface of the light source substrate 21. As a result, out of light emitted from the first light source 221, it is possible to shield light traveling toward the front face side without passing through the first light guide 231. As a result, in the planar light source device 20A of the liquid crystal display device according to the second embodiment, it is possible to prevent the light, which travels toward the front face side without passing through the first light guide 231 out of the light emitted from the first light source 221, from appearing on the display screen as a spot having higher luminance than the light emitted from the first light guide 231.

Other configurations of the planar light source device 20A of the liquid crystal display device according to the second embodiment are similar to those of the planar light source device 20 of the liquid crystal display device according to the first embodiment. Therefore, other configurations and effects in the planar light source device 20A of the liquid crystal display device according to the second embodiment are as described in the planar light source device 20 of the liquid crystal display device according to the first embodiment. In the description of the planar light source device 20A of the liquid crystal display device according to the second embodiment, the first partition wall 241A of the partition frame 24 has been described as an example. However, as long as only the function of preventing the first light guide 231 from falling off or missing from the first light emitting region 801 is achieved, the protrusion protruding toward the first light guide 231 does not need to be provided at the position overlapping the light source 22 when viewed from the direction orthogonal to the mounting surface of the light source substrate 21. In this case, a protrusion may be provided on the second partition wall 242. Furthermore, if the light source 22 is provided along the second partition wall 242, the protrusion provided on the second partition wall 242 is provided at a position overlapping the light source 22 when viewed from a direction orthogonal to the mounting surface of the light source substrate 21, and thus, it is possible to suppress light, which travels toward the front face side without passing through the first light guide 231 among the light emitted from the first light source 221, from appearing on the display screen as a spot having higher luminance than the light emitted from the first light guide 231.

Third Embodiment

Figure 18:
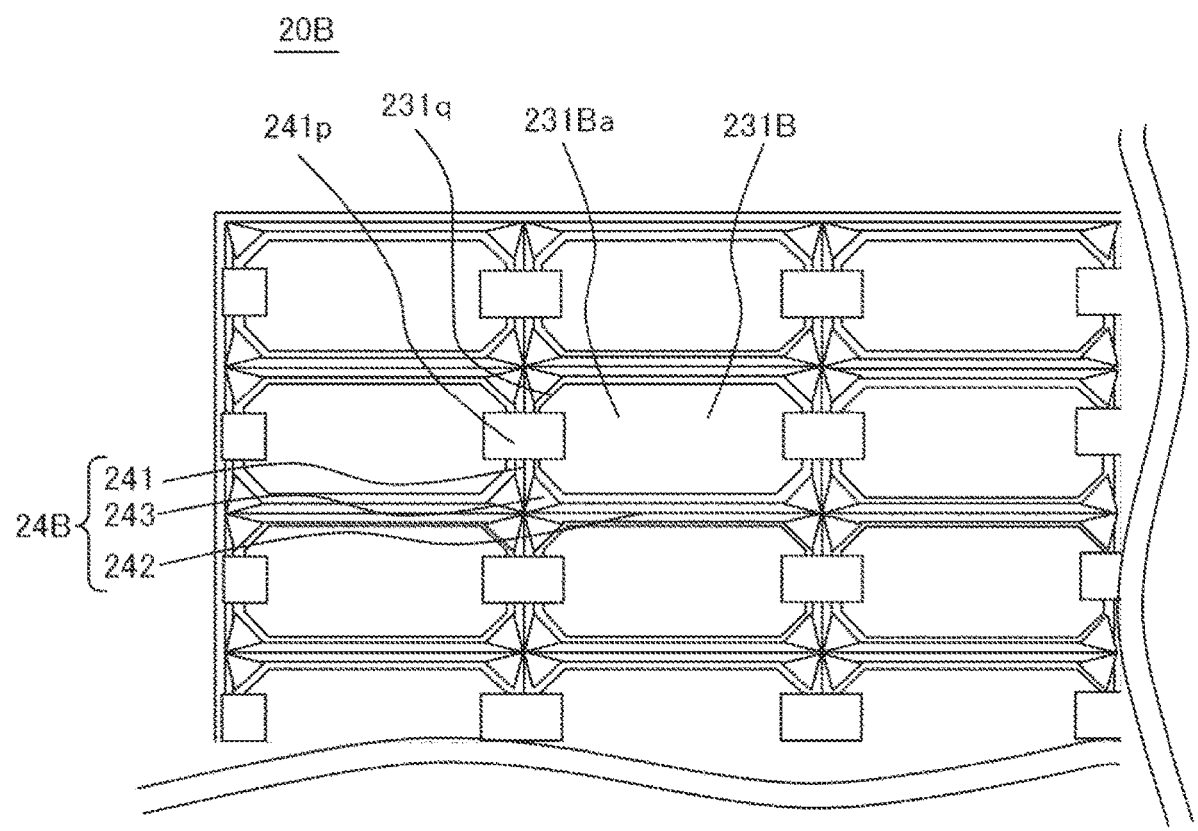
FIG. 18 is a plan view of a planar light source device of a liquid crystal display device according to a third embodiment from which a diffusion plate is removed.
Figure 19:
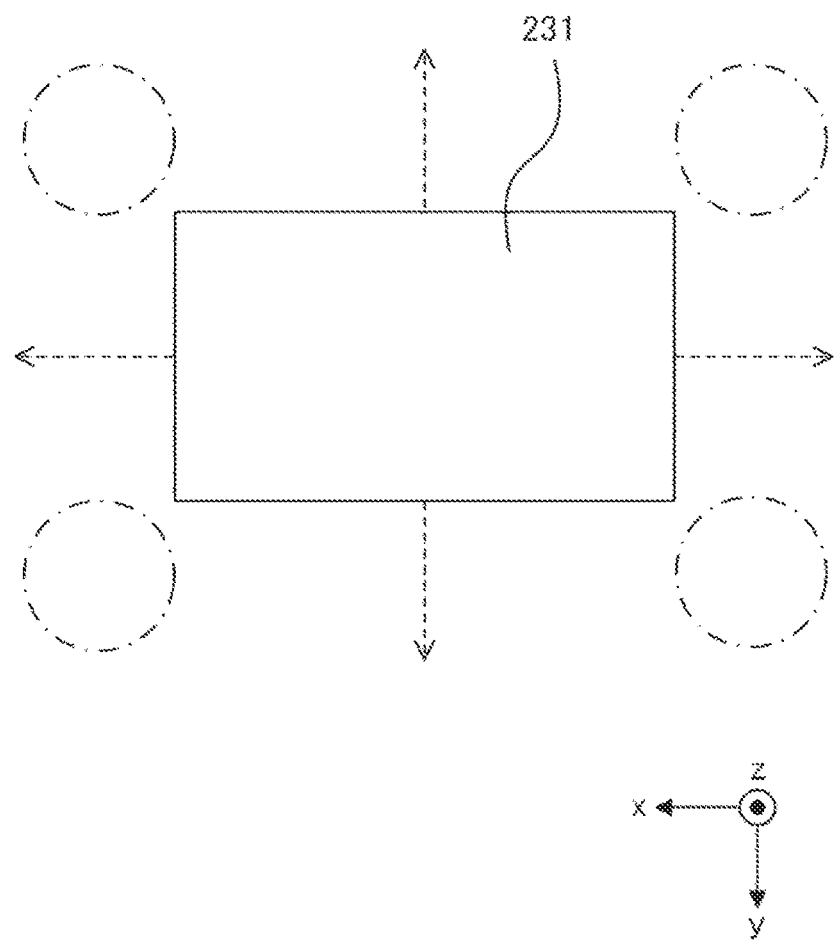
FIG. 19 is a view illustrating a light guide and a direction of light emitted from the light guide according to a comparative example.
Figure 20:
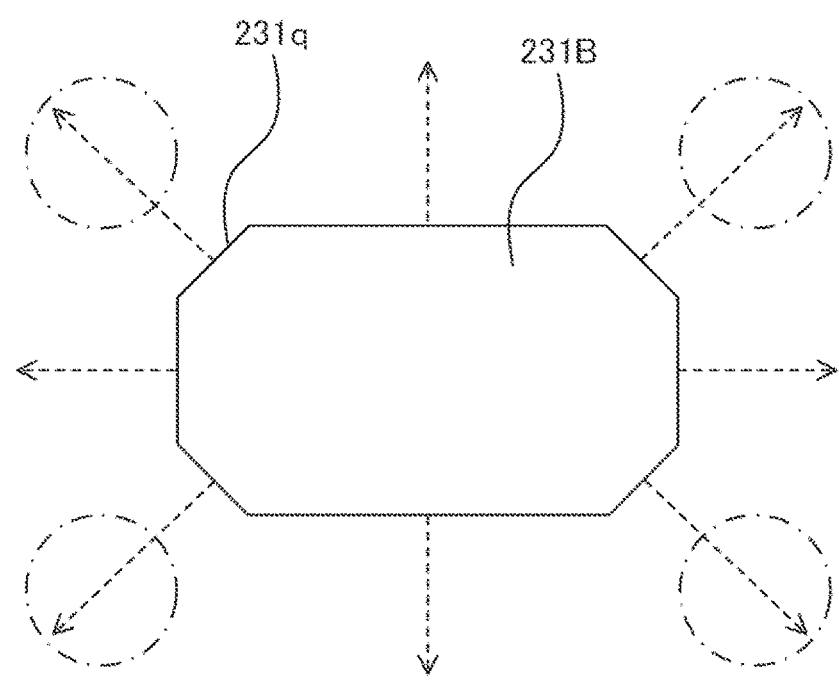
FIG. 20 is a view illustrating a light guide and a direction of light emitted from the light guide according to the third embodiment.

FIG. 18 is a plan view of a planar light source device 20B according to a third embodiment from which a diffusion plate is removed. FIG. 19 is a plan view illustrating a light guide according to a comparative example and a direction of light emitted from the light guide. FIG. 20 is a plan view illustrating a light guide according to the third embodiment and a direction of light emitted from the light guide. A difference between the planar light source device 20B of the liquid crystal display device according to the third embodiment and the planar light source device 20A of the liquid crystal display device according to the second embodiment is a light guide and a partition frame. Therefore, the reference numeral of the first light guide according to the third embodiment is 231B, and the reference numeral of the partition frame is 24B.

In the planar light source device 20B, as illustrated in FIG. 18, a first light guide 231B has an octagonal shape formed by chamfering a rectangle when viewed from a direction orthogonal to the mounting surface of the light source substrate 21. Accordingly, a new side face 231q is formed on the first light guide 231B. In addition, the partition frame 24B of the planar light source device 20B has a side wall 243 extending in parallel with a chamfered-rectangle portion formed by the first light guide 231B and facing the chamfered-rectangle portion formed by the first light guide 231B and when viewed from a direction orthogonal to the mounting surface of the light source substrate 21. Here, a gap is provided between the side wall 243 and the emitting surface of the first light guide 231B. In addition, the angle formed by the wall surface provided on the side wall 243 and the bottom face of the side wall 243 is an acute angle, that is, less than 90 degrees. Further, the side wall 243 is provided at each of four corners of a rectangular light emitting region surrounded by the partition frame 24 when viewed from a direction orthogonal to the mounting surface of the light source substrate 21. Note that, that the chamfered-rectangle portion formed by the first light guide 231B and the side wall 243 are parallel to each other means parallel in a practically possible range in manufacturing the planar light source device, and does not mean strict parallel.

In the planar light source device 20B according to the third embodiment configured as described above, it is possible to further suppress the darkening of the partition frame portion as compared with the planar light source device 20A according to the second embodiment. Specifically, as illustrated in FIG. 19, the direction of the light leaking out from a side face of the light guide to the partition frame is basically a direction orthogonal to the side face. Therefore, when the corner where the side face intersects is not chamfered as in the first light guide 231 according to the second embodiment, the vicinity of the corner of the rectangle formed by the first light guide 231 becomes dark when viewed from the direction orthogonal to the mounting surface of the light source substrate 21. However, as illustrated in FIG. 20, in the first light guide 231B according to the third embodiment, when viewed from the direction orthogonal to the mounting surface of light source substrate 21, each corner of the rectangle formed by the first light guide 231B is chamfered. As a result, in the first light guide 231B according to the third embodiment, the new side face 231q is formed with respect to the rectangular corner formed by the first light guide 231 according to the first embodiment or the second embodiment. As a result, in the first light guide 231B according to the third embodiment, light can be emitted in a direction in which light cannot be emitted by the first light guide 231 according to the first embodiment or the second embodiment. Then, the light from the new side face 231q can be reflected by each partition wall of the partition frame 24B toward the front face side of the partition frame 24B. As a result, the planar light source device 20B according to the third embodiment can further suppress the darkening of the partition frame portion as compared with the planar light source device 20A according to the second embodiment.

In addition, the planar light source device 20B according to the third embodiment includes the side wall 243 that extends in parallel with a chamfered-rectangle portion formed by the first light guide 231B and faces the chamfered-rectangle portion formed by the first light guide 231B, that is, faces the new side face 231q when viewed from the direction orthogonal to the mounting surface of the light source substrate 21. In addition, a gap is provided between the side wall 243 and the emitting surface of the first light guide 231B. An angle formed by the wall surface and the bottom face of the side wall 243 is an acute angle. Accordingly, the side wall 243 faces the front face side. In addition, since the side wall 243 extends in parallel with the new side face 231q and faces the new side face 231q, the side wall 243 can reflect the light from the new side face 231q more to the region on the front face side of the partition frame 24B than the first partition wall 241 and the second partition wall 242. Therefore, the light leaking from the new side face 231q of the first light guide 231B toward the partition frame 24B easily travels toward the region on the front face side of the partition frame 24B by the wall surface of the side wall 243 as compared with the case where only the first partition wall 241 and the second partition wall 242 are provided. Note that in the planar light source device 20B of the liquid crystal display device according to the third embodiment, the partition frame 24B has the side wall 243. However, only by chamfering the first light guide 231B, it is possible to further suppress the darkening of the partition frame portion as compared with the planar light source device 20A of the liquid crystal display device according to the second embodiment.

Other configurations in the planar light source device 20B of the liquid crystal display device according to the third embodiment are similar to those of the planar light source device 20A of the liquid crystal display device according to the second embodiment. Therefore, other configurations and effects in the planar light source device 20B of the liquid crystal display device according to the third embodiment are as described in the planar light source device 20A of the liquid crystal display device according to the second embodiment. In addition, the configurations and effects in the planar light source device 20A of the liquid crystal display device according to the second embodiment, which are described as being similar to those in the planar light source device 20 of the liquid crystal display device according to the first embodiment, are also similar to those in the planar light source device 20 of the liquid crystal display device according to the first embodiment for the planar light source device 20B of the liquid crystal display device according to the third embodiment. Therefore, the configurations and effects in the planar light source device 20A of the liquid crystal display device according to the second embodiment, which are described as being similar to those in the planar light source device 20 of the liquid crystal display device according to the first embodiment, and the configurations and effects other than those described above in the planar light source device 20B of the liquid crystal display device according to the third embodiment are as described in the planar light source device 20 of the liquid crystal display device according to the first embodiment.

Other Embodiments

The planar light source device and the liquid crystal display device including the planar light source device according to the present disclosure are not limited to the above-described embodiments, and can be changed within the scope of the gist of the present disclosure. For example, the number of light sources may be one or three or more for one light emitting region. In addition, the reflection sheet 25 can be substituted by applying white coating on the light source substrate 21. That is, the reflection sheet 25 is not an essential component. Furthermore, a groove for containing the light source 22 provided in the light guide 23 is also not essential. In addition, the shapes of the first partition wall 241 and the second partition wall 242 may be the same. In addition, when the light from the light source 22 is incident on the light guide 23, it is not essential that the center of the light emitting surface of the light source 22 is positioned closer to the light source substrate than the center of the incident surface of the light guide 23. Furthermore, the mechanism for emitting the light incident from the light source 22 from the emitting surface by the light guide 23 may be achieved by providing a fine hole inside the light guide 23 instead of the depressed portion provided on the surface of the light guide 23 on the light source substrate side. In addition, only one wall surface provided on the partition wall included in the partition frame may form an acute angle with the bottom face of the partition wall, or all the wall surfaces of all the partition walls may form an acute angle with the bottom face of the partition wall. In the above embodiments, among the plurality of light sources, light guides, and partition walls, the configurations and effects of some of the light sources, light guides, and partition walls have been described. However, other light sources, light guides, and partition walls included in the planar light source device according to the present disclosure may have similar configurations and effects, and only some of the light sources, light guides, and partition walls may have the above-described configurations and effects. Furthermore, it is arbitrary which of the plurality of light sources and the plurality of light guides included in the planar light source device is set as the first light source and which is set as the first light guide. In addition, the embodiments may be combined.

REFERENCE SIGNS LIST

20: planar light source device, 20A: planar light source device, 20B: planar light source device, 21: light source substrate, 22: light source, 221p: light emitting surface, 24: partition frame, 24A: partition frame, 24B: partition frame, 100: liquid crystal display device, 221: first light source, 222: second light source, 223: second light source, 231: first light guide, 231a: first emitting surface, 231d: depressed portion, 231s: incident surface, 231B: first light guide, 232: second light guide, 232a: second emitting surface, 233: second light guide, 233a: second emitting surface, 241: first partition wall, 241b: bottom face, 241A: first partition wall, 241w1: wall surface, 241w2: wall surface, 241p: protrusion, 242: second partition wall, 242b: bottom face, 242w1: wall surface, 242w2: wall surface, 243: side wall, 801: first light emitting region, 802: second light emitting region, 803: second light emitting region

The invention claimed is:

1. A planar light source device, comprising: a plurality of light sources that is arranged on a mounting surface of a light source substrate and that is independently drivable; a first light guide to emit light incident from a first light source included in the plurality of light sources from a first emitting surface in an emitting direction opposite to a direction from the first light source toward the light source substrate; a second light guide that is contained in a second light emitting region on the mounting surface, the second light emitting region being adjacent to a first light emitting region containing the first light guide, and that emits light incident from a second light source included in the plurality of light sources from a second emitting surface in the emitting direction; and a partition frame having a partition wall that is positioned between the first light guide and the second light guide, partitions the first light emitting region and the second light emitting region, and is provided with a gap apart from the first emitting surface, wherein an angle formed by a wall surface of the partition wall on a side of the first light guide and a bottom face of the partition wall is an acute angle; and wherein the partition wall includes a first partition wall facing the first light source with the first light guide interposed between the first partition wall and the first light source, and a second partition wall intersecting the first partition wall, and an angle formed by a wall surface of the first partition wall on the first light guide side and a bottom face of the first partition wall is smaller than an angle formed by a wall surface of the second partition wall on the first light guide side and a bottom face of the second partition wall.

2. The planar light source device according to claim 1, wherein
the partition wall includes a first partition wall facing the first light source with the first light guide interposed between the first partition wall and the first light source, and a second partition wall intersecting the first partition wall, and
a height of the second partition wall is higher than a height of the first partition wall in a direction orthogonal to the mounting surface.

3. The planar light source device according to claim 1, wherein
the partition wall includes a first partition wall facing the first light source with the first light guide interposed between the first partition wall and the first light source, and a second partition wall intersecting the first partition wall,
an angle formed by a wall surface of the first partition wall on the first light guide side and a bottom face of the first partition wall is smaller than an angle formed by a wall surface of the second partition wall on the first light guide side and a bottom face of the second partition wall, and
a height of the second partition wall is higher than a height of the first partition wall in a direction orthogonal to the mounting surface.

4. The planar light source device according to claim 1, wherein
a center of a light emitting surface that emits light of the first light source is closer to the light source substrate than a center of an incident surface of the first light guide on which the light emitted from the first light source is incident in a direction orthogonal to the mounting surface, and
in the direction orthogonal to the mounting surface, a position of an end of the light emitting surface positioned on the light source substrate side is farther from the light source substrate than a position of an end of the incident surface positioned on the light source substrate side.

5. The planar light source device according to claim 1, wherein
a surface facing the first emitting surface is provided with a plurality of depressed portions having different depths, and
a shape of a surface of each of the plurality of depressed portions is a spherical surface having a same radius of curvature.

6. The planar light source device according to claim 1, wherein
the partition wall has a protrusion protruding toward the first emitting surface, and
the protrusion overlaps the first emitting surface when viewed from a direction orthogonal to the mounting surface.

7. The planar light source device according to claim 6, wherein the protrusion overlaps the first light source when viewed from a direction orthogonal to the mounting surface.

8. The planar light source device according to claim 1, wherein the first light guide has a chamfered-rectangle octagon when viewed from a direction orthogonal to the mounting surface.

9. The planar light source device according to claim 8, wherein
the partition frame has a side wall extending in parallel with a chamfered-rectangle portion and facing the chamfered-rectangle portion when viewed from a direction orthogonal to the mounting surface,
a gap is provided between the side wall and the first emitting surface, and
an angle formed by a wall surface of the side wall and a bottom face of the side wall is an acute angle.

10. A liquid crystal display device, comprising:
the planar light source device according to claim 1; and
a display panel to display an image on a screen by transmitting or shielding light from the planar light source device.

* * * * *